United States Patent
Takeda et al.

(10) Patent No.: US 7,893,373 B2
(45) Date of Patent: Feb. 22, 2011

(54) MULTI-SEGMENT BACKLIGHT SYSTEM AND METHOD FOR KEYBOARDS

(75) Inventors: Toshisada Takeda, Simi Valley, CA (US); Wataru Kudo, Yokohama (JP)

(73) Assignee: Minebea Co., Ltd. (JP)

( * ) Notice: Subject to any disclaimer, the term of this patent is extended or adjusted under 35 U.S.C. 154(b) by 316 days.

(21) Appl. No.: 12/146,412

(22) Filed: Jun. 25, 2008

(65) Prior Publication Data

US 2009/0002200 A1    Jan. 1, 2009

Related U.S. Application Data

(60) Provisional application No. 60/946,779, filed on Jun. 28, 2007.

(51) Int. Cl.
*H01H 13/83* (2006.01)
(52) U.S. Cl. .............. 200/310; 200/5 A; 200/314; 200/317; 362/30
(58) Field of Classification Search .......... 200/5 A, 200/310–317; 341/22, 23, 28; 345/168–170, 345/173, 176; 400/472; 362/23, 26, 27, 362/29, 600, 601, 611, 613, 615, 616, 84, 362/97.1, 97.2, 97.3, 249.12, 249.05, 30; 250/472.1, 483.1, 484.2, 486.1
See application file for complete search history.

(56) References Cited

U.S. PATENT DOCUMENTS

| | | | | |
|---|---|---|---|---|
| 3,650,824 A * | 3/1972 | Szepesi et al. | ........... | 428/432 |
| 4,138,620 A * | 2/1979 | Dickson | ........... | 313/1 |
| 4,266,164 A * | 5/1981 | Schroeder | ........... | 315/169.1 |
| 4,636,593 A | 1/1987 | Novak et al. | | |
| 4,812,831 A * | 3/1989 | Laier | ........... | 345/175 |
| 5,432,684 A | 7/1995 | Fye et al. | | |
| 5,491,313 A | 2/1996 | Bartley et al. | | |
| 5,521,342 A | 5/1996 | Bartley et al. | | |
| 6,198,677 B1 | 3/2001 | Hsu et al. | | |
| 6,199,996 B1 * | 3/2001 | Katrinecz et al. | ........... | 362/85 |
| 6,217,183 B1 * | 4/2001 | Shipman | ........... | 362/30 |
| 6,284,988 B1 * | 9/2001 | Watanabe et al. | ........... | 200/5 A |
| 6,467,924 B2 | 10/2002 | Shipman | | |

(Continued)

FOREIGN PATENT DOCUMENTS

JP    04-88623    7/1992

(Continued)

*Primary Examiner*—Michael A Friedhofer
(74) *Attorney, Agent, or Firm*—Kilpatrick Townsend & Stockton LLP

(57) ABSTRACT

An electroluminescent apparatus includes a protection layer characterized by two or more non-overlapping regions and a back electrode layer which includes two or more back electrode regions. Each of the back electrode regions overlies a corresponding one of the non-overlapping regions in the protection layer. A bottom insulation layer includes two or more bottom insulation regions, each of which overlying a corresponding one of the back electrode regions. The apparatus includes two or more electroluminescent segments, each of which overlying a corresponding one of the back electrode layers. A transparent electrode layer includes two or more transparent electrode regions, each overlying a corresponding one of electroluminescent segments. The apparatus includes two or more power supply devices, each of which coupled to a corresponding one of the back electrode regions and to a corresponding one of the transparent electrode regions for providing luminescence over a corresponding one of the non-overlapping regions.

49 Claims, 8 Drawing Sheets

U.S. PATENT DOCUMENTS

| | | |
|---|---|---|
| 6,686,549 B2 | 2/2004 | Douzono et al. |
| 6,860,612 B2 | 3/2005 | Chiang et al. |
| 6,871,978 B2 * | 3/2005 | Chan et al. .................... 362/85 |
| 6,987,466 B1 * | 1/2006 | Welch et al. .................. 341/22 |
| 7,172,302 B1 | 2/2007 | Dittus |
| 7,193,536 B2 | 3/2007 | Shipman |
| 2007/0063978 A1 | 3/2007 | Cathey |
| 2007/0081320 A1* | 4/2007 | Gilbert ........................ 362/34 |
| 2009/0128371 A1* | 5/2009 | Lo .............................. 341/23 |

FOREIGN PATENT DOCUMENTS

| | | |
|---|---|---|
| JP | 05-128934 | 5/1993 |
| JP | 07-319594 | 12/1995 |
| JP | 10-188718 | 7/1998 |
| JP | 11-039983 | 2/1999 |
| JP | 11-039984 | 2/1999 |
| JP | 2002-251937 | 9/2002 |
| JP | 2002289359 A * | 10/2002 |
| TW | 090129698 | 11/2001 |

* cited by examiner

MULTI-SEGMENT BACKLIGHT SYSTEM AND METHOD FOR KEYBOARDS

CROSS-REFERENCES TO RELATED APPLICATIONS

This application claims priority to U.S. Provisional Patent Application No. 60/946,779, filed Jun. 28, 2007, commonly assigned and incorporated herein by reference for all purposes.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to computing devices. More particularly, the invention provides a keyboard apparatus and related methods having a backlighting characteristic for lighting one or more keys. Merely by way of example, the invention has been applied to a keyboard apparatus for a desk top computer, although it can also be applied to a laptop computer, modular computer, and other computing devices.

Computing devices have proliferated. In the early days, large mainframe computers dominated the computing landscape. These large mainframe computers were developed by companies such as IBM Corporation of Armonk, N.Y. Mainframe computers have been replaced, at least in part, by smaller computing devices, commonly known as "PCs." PCs come in various shapes and sizes. PCs are often run using computer software such as XPTM from Microsoft Corporation from Redmond Wash. Other types of computer software come from Apple Computer of Cupertino, Calif. Smaller PC versions are often called "lap top computers." Other types of PCs include larger desktop versions. Still other versions of PCs can be found in smaller devices such as personal digital assistants, called PDAs, cellular phones, and a variety of other applications.

All of these computing devices generally require input devices for human users to interact with them. As merely an example, computer keyboards are most commonly used as such input devices for inputting characters, numerals and symbols to electronic devices, particularly to these computing devices such as the PCs. While such keyboards are generally useful in lighted buildings, they may be difficult to use in a darker setting. As an example, such darker setting may be inside an airplane, which has been dimmed. Additionally, the larger setting may be in an unlighted building or other unlighted environment. To overcome these darker settings, certain keyboard devices have been lighted using various lighting techniques. These lighting techniques include use of individual light emitting diodes to emit light to individual key pads. Alternatively, light emitting crystals in the form of illuminating materials have been used to emit light to individual key pads. Various other techniques have been proposed. Unfortunately, these techniques have many limitations, which will be described throughout the present specification and more particularly below.

From the above, it is seen that techniques for improving keyboards for computing devices are highly desirable.

BRIEF SUMMARY OF THE INVENTION

According to the present invention, techniques for computing devices are provided. More particularly, the invention provides a keyboard apparatus and related methods having a backlighting characteristic for lighting one or more keys. Merely by way of example, the invention has been applied to a keyboard apparatus for a desk top computer, although it can also be applied to a laptop computer, modular computer, and other computing devices.

In a specific embodiment, the present invention provides an electroluminescent apparatus. The electroluminescent apparatus includes a protection layer characterized by two or more non-overlapping regions and a back electrode layer, the back electrode layer including two or more back electrode regions. Each of the two or more back electrode regions overlies a corresponding one of the two or more non-overlapping regions in the protection layer. The electroluminescent apparatus also includes a bottom insulation layer, which includes two or more bottom insulation regions. Each of the two or more bottom insulating regions overlies a corresponding one of the back electrode regions. The electroluminescent apparatus also includes two or more electroluminescent segments, each of which overlying a corresponding one of the back electrode layers. The apparatus includes a transparent electrode layer which includes two or more transparent electrode regions. Each of the two or more transparent electrode regions overlies a corresponding one of electroluminescent segments. The electroluminescent apparatus also includes two or more power supply devices, each of which being coupled to a corresponding one of the back electrode regions and being coupled to a corresponding one of the transparent electrode regions for providing luminescence over a corresponding one of the non-overlapping regions.

In a specific embodiment of the electroluminescent apparatus, the luminescent segments includes a phosphor-containing material. In an embodiment, the electroluminescent apparatus also includes a first conductive material between two adjacent transparent electrode regions in the transparent electrode layer, the first conductive material being electrically grounded to insulate the two adjacent transparent electrode regions. In another embodiment, the electroluminescent apparatus includes a second conductive material between two adjacent back electrode regions in the back electrode layer, the second conductive material being electrically grounded to insulate the two adjacent back electrode regions. In an embodiment, the electroluminescent apparatus includes a first conductive material between two adjacent transparent electrode regions in the transparent electrode layer, the first conductive material being electrically grounded to insulate the two adjacent transparent electrode regions, and a second conductive material between two adjacent back electrode regions in the back electrode layer, the second conductive material being electrically grounded to insulate the two adjacent back electrode regions, wherein the first conductive material is electrically coupled to the second conductive material.

In another specific embodiment of the electroluminescent apparatus, the transparent electrode layer further comprises a second plurality of conductive material, each of the second plurality of conductive material being disposed between each pair of adjacent transparent electrode regions in the transparent electrode layer, second plurality of conductive material being electrically grounded. In another embodiment, the back electrode layer further comprises a second plurality of conductive material, each of the second plurality of conductive material being disposed between each pair of adjacent back electrode regions in the back electrode layer, each of the second plurality of conductive material being electrically grounded.

According to another embodiment of the invention an electroluminescent apparatus is provided. The apparatus includes a protection layer characterized by two or more non-overlapping regions; a back electrode layer, the back electrode layer including two or more back electrode regions, each of the two or more back electrode regions overlying a corresponding one of the two or more non-overlapping regions in the protection layer; a bottom insulation layer, a bottom insulation layer including two or more bottom insulation regions, each of the two or more bottom insulating regions overlying a corresponding one of the back electrode regions; a phosphor layer, the phosphor layer including two or more of phosphor regions, each of the two or more phosphor regions overlying a corresponding one of the back electrode layers; a transparent electrode layer, the transparent electrode layer including two or more transparent electrode regions, each of the two or more transparent electrode region overlying a corresponding one of the phosphor regions; and two or more power supply devices, each of the two or more power supply devices being coupled to a corresponding one of the back electrode regions and a corresponding one of the transparent electrode regions for providing luminescence over a corresponding one of the non-overlapping regions.

In an alternative embodiment, the invention provides a keyboard apparatus which includes a housing. A first plurality of key pads are spatially disposed within the housing. Each of the key pads is depressible upon touch by a user. The first plurality of key pads are distributed in a second plurality of non-overlapping keyboard regions. The keyboard includes an optically transparent circuit board coupled to a backside of each of the key pads. The keyboard also includes a luminescent apparatus which includes a second plurality of electroluminescent segments. Each of the second plurality of electroluminescent segments includes one of a corresponding plurality of power supply devices. Each of the second plurality of electroluminescent segments provides electromagnetic radiation to a respective non-overlapping keyboard region for lighting key pads in the respective non-overlapping keyboard region.

In another specific embodiment, the invention provides a keyboard apparatus which includes a housing. A first plurality of key pads spatially disposed within the housing. Each of the key pads is depressible upon touch by a user. The first plurality of key pads are distributed in a first plurality of non-overlapping keyboard regions. Each of the non-overlapping regions includes fewer than all of the first plurality of keypads. The keyboard apparatus includes an optically transparent circuit board coupled to a backside of each of the key pads and a first plurality of electroluminescent segments arranged in a non-planar configuration. Each of the first plurality of electroluminescent segments includes one of a corresponding plurality of power supply devices. Each of the first plurality of electroluminescent segments provides electromagnetic radiation to a respective non-overlapping keyboard region for lighting key pads in the respective non-overlapping keyboard region. Each of the non-overlapping regions includes fewer than all of the first plurality of keypads. Accordingly, each of the first plurality of electroluminescent segments provides electromagnetic radiation for lighting fewer than all of the first plurality of keypads.

In yet another embodiment, the invention provides a keyboard apparatus which includes a housing. A first plurality of key pads are spatially disposed within the housing. Each of the key pads is depressible upon touch by a user. The first plurality of key pads are distributed in a second plurality of non-overlapping keyboard regions. Each of the non-overlapping regions includes fewer than all of the first plurality of keypads. The keyboard apparatus includes an optically transparent circuit board coupled to a backside of each of the key pads and a luminescent apparatus. The luminescent apparatus includes a second plurality of electroluminescent segments, each of which includes one of a corresponding plurality of power supply devices. Each of the second plurality of electroluminescent segments provides electromagnetic radiation to a respective non-overlapping keyboard region for lighting key pads in the respective non-overlapping keyboard region. Each of the non-overlapping regions including fewer than all of the first plurality of keypads; that is, each of the first plurality of electroluminescent segments provides electromagnetic radiation for lighting fewer than all of the first plurality of keypads.

According to another embodiment, the method provides a method for manufacturing a luminescent device for a keyboard apparatus. The method includes the following processes.

1. Provide a protection layer characterized by two or more non-overlapping regions;
2. Provide a back electrode layer, the back electrode layer including two or more back electrode regions, each of the two or more back electrode regions overlying a corresponding one of the two or more non-overlapping regions in the protection layer;
3. Add a bottom insulation layer, a bottom insulation layer including two or more bottom insulation regions, each of the two or more bottom insulating regions overlying a corresponding one of the back electrode regions;
4. Add two or more phosphor segments, each of the two or more phosphor segments overlying a corresponding one of the back electrode layers;
5. Add a transparent electrode layer, the transparent electrode layer including two or more transparent electrode regions, each of the two or more transparent electrode region overlying a corresponding one of the phosphor regions; and
6. Provide two or more power supply devices, each of the two or more power supply devices being coupled to a corresponding one of the back electrode regions and a corresponding one of the transparent electrode regions for providing luminescence over a corresponding one of the non-overlapping regions.

In yet another alternative embodiment, the invention provides a method for making a keyboard apparatus. The method includes the following processes.

1. Provide a housing including a first plurality of key pads spatially disposed within the housing, each of the key pads being depressible upon touch by a user, the first plurality of key pads being distributed in a second plurality of non-overlapping keyboard regions;
2. Provide an optically transparent circuit board coupled to a backside of each of the key pads; and
3. Provide a luminescent apparatus including a second plurality of electroluminescent segments, each of the second plurality of electroluminescent segments including one of a corresponding plurality of power supply devices, each of the second plurality of electroluminescent segments providing electromagnetic radiation to a respective non-overlapping keyboard region for lighting key pads in the respective non-overlapping keyboard region.

Many benefits are achieved by way of this invention. One or more benefits can be achieved in one or more of the embodiments.

1. Efficient back light source including separate luminescent segments, which may be non-planar, providing lighting to different regions of a keyboard;
2. Thinner and smaller power supply system for providing AC power to the luminescent segments;
3. Improved electrical connection techniques for isolation separate regions and compensating for variations in the manufacturing of the luminescent segments; and
4. Separate segments and independent drivers coupled to each region for providing uniform illumination for non-planar configurations.

In a specific embodiment, the method and apparatus may also be more efficient than conventional techniques. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for computing devices are provided. More particularly, the invention provides a keyboard apparatus and related methods having a backlighting characteristic for lighting one or more keys. Merely by way of example, the invention has been applied to a keyboard apparatus for a desk top computer, although it can also be applied to a laptop computer, modular computer, and other computing devices.

Depending upon the embodiment, the present invention includes one or more of various features, which may be used. These features include the following:

1. An efficient back light source including separate luminescent segments providing lighting to different regions of a keyboard;
2. A technique for smaller and thinner power supply system for providing AC power to the luminescent segments;
3. Improved electrical connection techniques for isolation separate regions and compensating for variations in the manufacturing of the luminescent segments; and
4. Separate segments and independent drivers coupled to each region for providing uniform illumination for non-planar configurations.

As shown, the above features may be in one or more of the embodiments to follow. These features are merely examples, which should not unduly limit the scope of the claims herein. One of ordinary skill in the art would recognize many variations, modifications, and alternatives.

Figure 1:
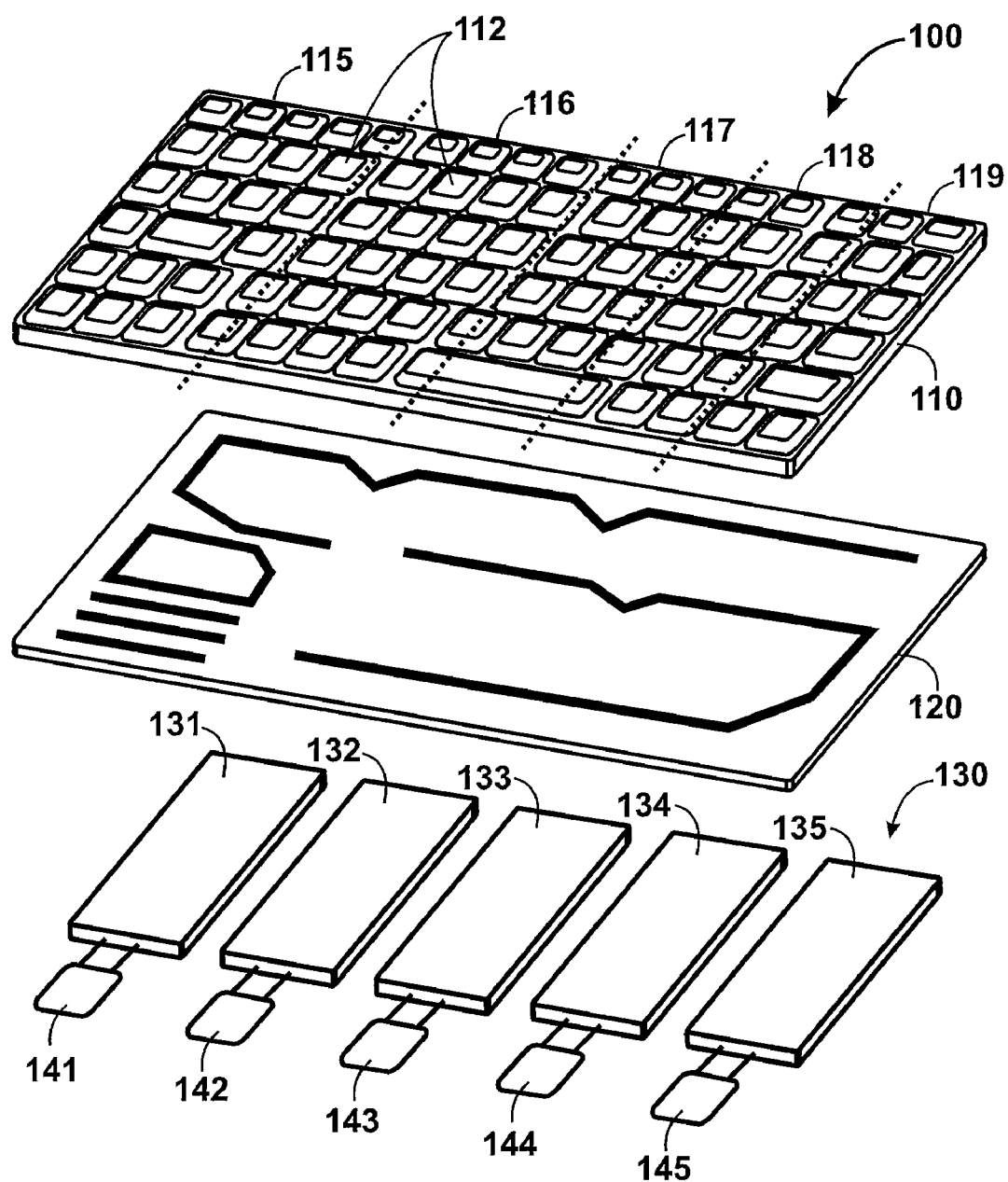
FIG. 1 is a simplified diagram of a keyboard apparatus according to an embodiment of the present invention.

FIG. 1 is a simplified diagram of a keyboard apparatus 100 according to an embodiment of the present invention. This diagram is merely an example, which should not unduly limit the scope of the claims herein. One of ordinary skill in the art would recognize other variations, modifications, and alternatives. As shown, keyboard apparatus 100 includes a housing 110. The housing includes a number of key pads 112 spatially disposed within the housing. Each of the key pads is depressable upon touch by a user. In an embodiment of the present invention, the housing 110 includes at least twenty-six key pads. In a specific embodiment, keyboard apparatus 100 includes twenty-six alphanumeric key pads typically used in a computer keyboard, for example, in a PC or a notebook computer. In an embodiment, key pads 112 are distributed in a second plurality of non-overlapping keyboard regions, such as 115, 116, . . . , 119. The keyboard apparatus 100 also includes an optically transparent circuit board 120 coupled to a backside of each of the key pads. In a specific embodiment, each key pad is coupled to the circuit board through a scissor switch, which activates a circuit to identify which particular keypad is being depressed by a user.

In a specific embodiment, key board apparatus 100 also includes a luminescent apparatus 130. In an embodiment, luminescent apparatus includes multiple electroluminescent segments, 131, 132, . . . , 135, etc. Each of the electroluminescent segments includes one of a corresponding plurality of power supply devices 141, 142, 145. Each of the electroluminescent segments provides electromagnetic radiation to a respective non-overlapping keyboard region for lighting key pads in the respective non-overlapping keyboard region 115, 116, . . . , 119.

Figure 2:
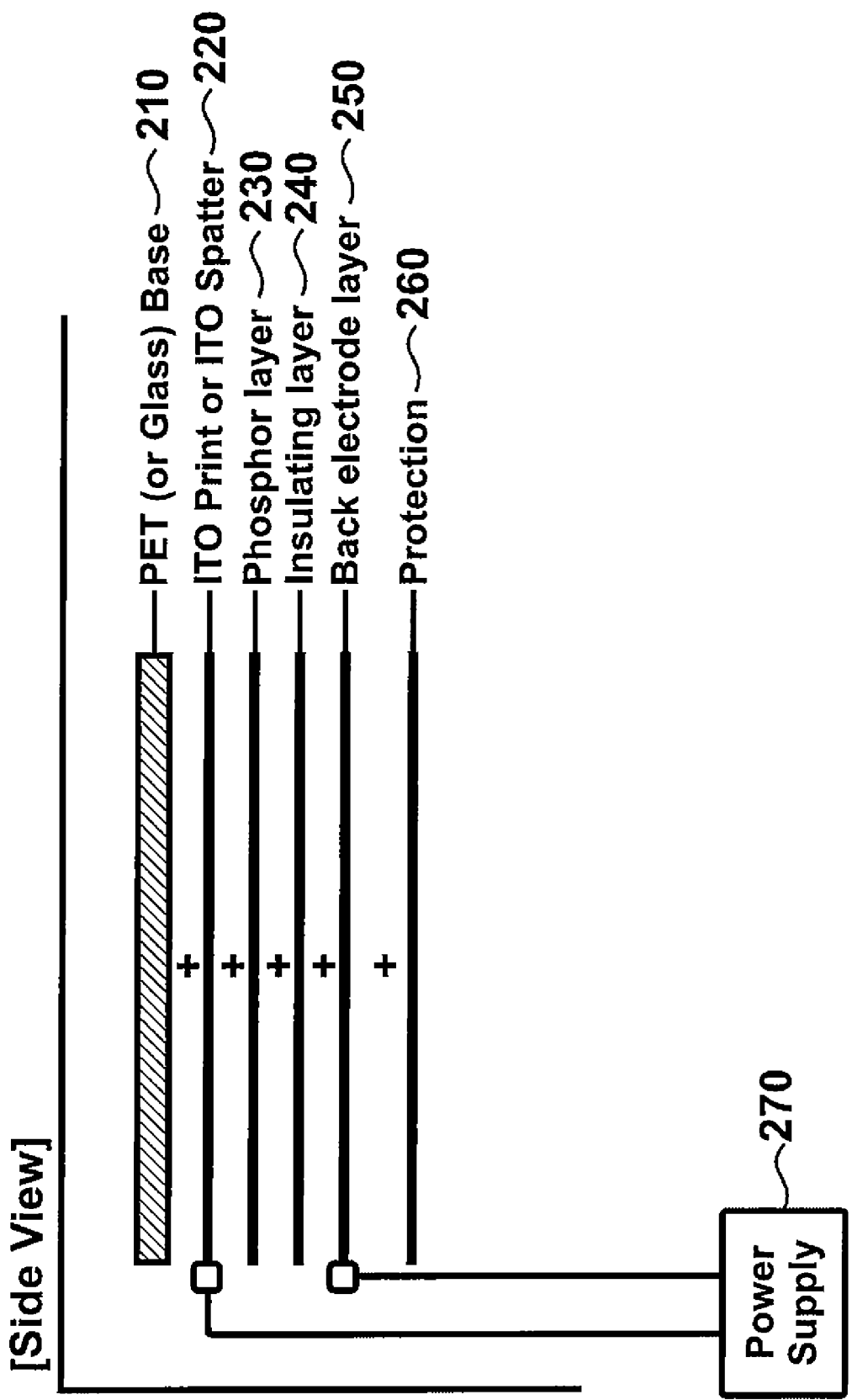
FIG. 2 is a simplified diagram of an electroluminescent segment according to an embodiment of the present invention.

FIG. 2 is a simplified cross-sectional view diagram of an electroluminescent segment 200 according to an embodiment of the present invention. This diagram is merely an example, which should not unduly limit the scope of the claims herein. One of ordinary skill in the art would recognize other variations, modifications, and alternatives. In an embodiment, electroluminescent segment 200 may be used in keyboard 100 as one the electroluminescent segments 131-135. As shown, electroluminescent segment 200 includes a PET or glass base layer 210, an ITO layer which is used as a front electrode, a phosphor layer 230, an insulating layer 240, a back electrode layer 250, and a protection layer 260. In a specific embodiment, the ITO layer and the back electrode layer are coupled to a power supply 270. An AC signal from power supply 270 is applied between the ITO layer and the back electrode layer, causing light to be produced from the phosphor material.

Figure 3:
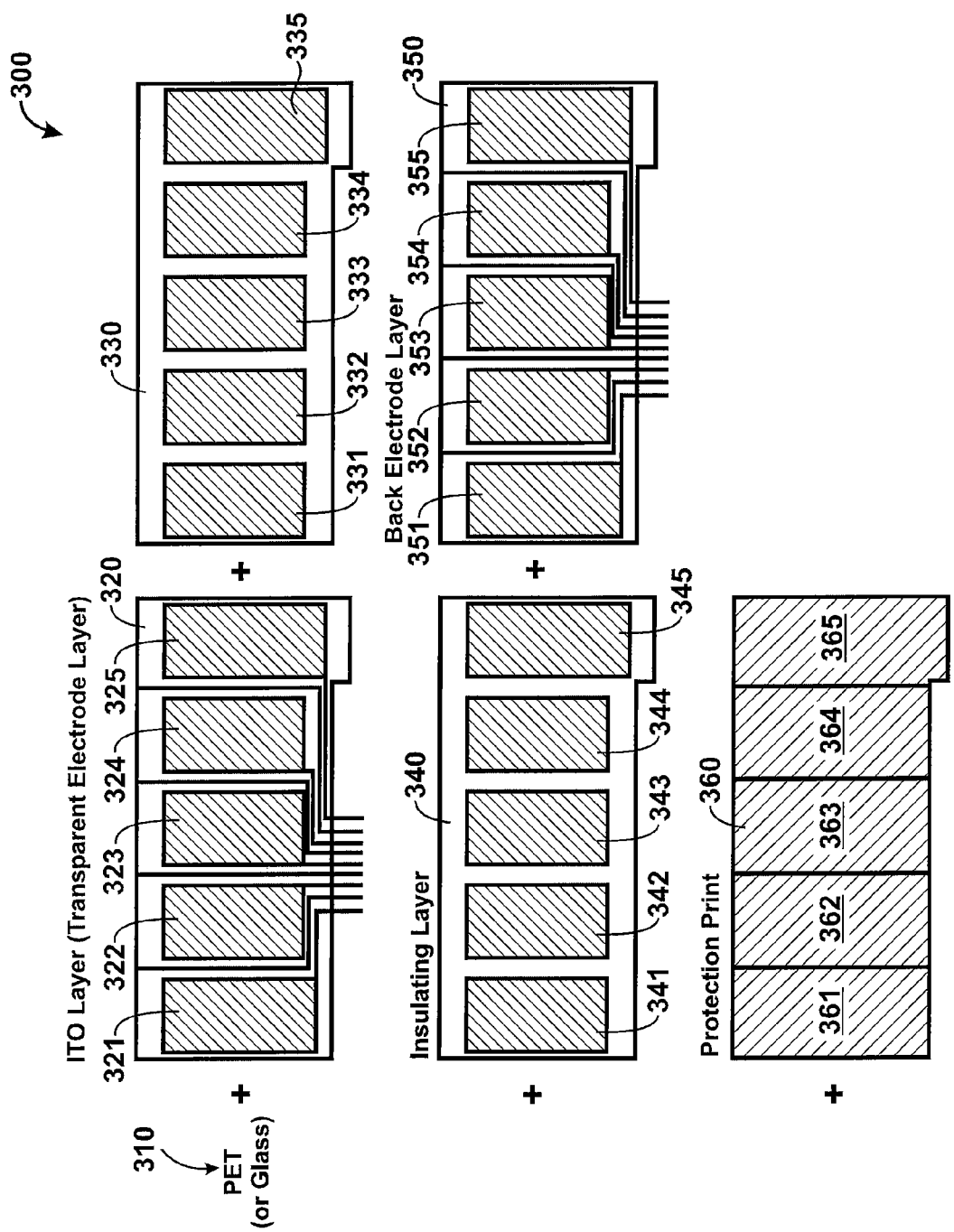
FIG. 3 is a simplified diagram of a luminescent apparatus according to an embodiment of the present invention.

FIG. 3 is a simplified diagram of a luminescent apparatus 300 according to an embodiment of the present invention. This diagram is merely an example, which should not unduly limit the scope of the claims herein. One of ordinary skill in the art would recognize other variations, modifications, and alternatives. As shown, luminescent apparatus 300 includes a protection layer 360 characterized by two or more non-overlapping regions, such as 361, 361, . . . , 365. In an embodiment, these regions are not physically divided regions of the protective layer, rather these regions mark the location of subsequent components of luminescent apparatus 300.

In an embodiment, luminescent apparatus 300 includes a back electrode layer 350, which includes two or more back electrode regions such as 351, 351, . . . , 355. Each of the back electrode regions overlying a corresponding one of the two or more non-overlapping regions in the protection layer 361, 361, . . . , 365. In an embodiment, luminescent apparatus 300 also includes a bottom insulation layer, a bottom insulation layer including two or more bottom insulation regions, each of the two or more bottom insulating regions overlying a corresponding one of the back electrode regions. In a specific embodiment luminescent apparatus 300 includes an insulation layer, which includes multiple insulating regions, 341, 342, . . . , 345. In an embodiment, luminescent apparatus 300 also includes two or more of phosphor regions 331, 332, . . . , 335, each of phosphor regions overlying a corresponding one of the back electrode layers.

In an embodiment, luminescent apparatus 300 includes a transparent electrode layer 320. In a specific embodiment, transparent electrode layer 320 may be an ITO layer. The transparent electrode layer 320 includes two or more transparent electrode regions 321, 322, . . . , 325. Each of the two or more transparent electrode regions overlies a corresponding one of the phosphor regions. In an embodiment, luminescent apparatus 300 also includes two or more power supply devices (not shown in FIG. 3). Each of the two or more power supply devices is coupled to a corresponding one of the back electrode regions and a corresponding one of the transparent electrode regions for providing luminescence over a corresponding one of the non-overlapping regions.

Figure 4:
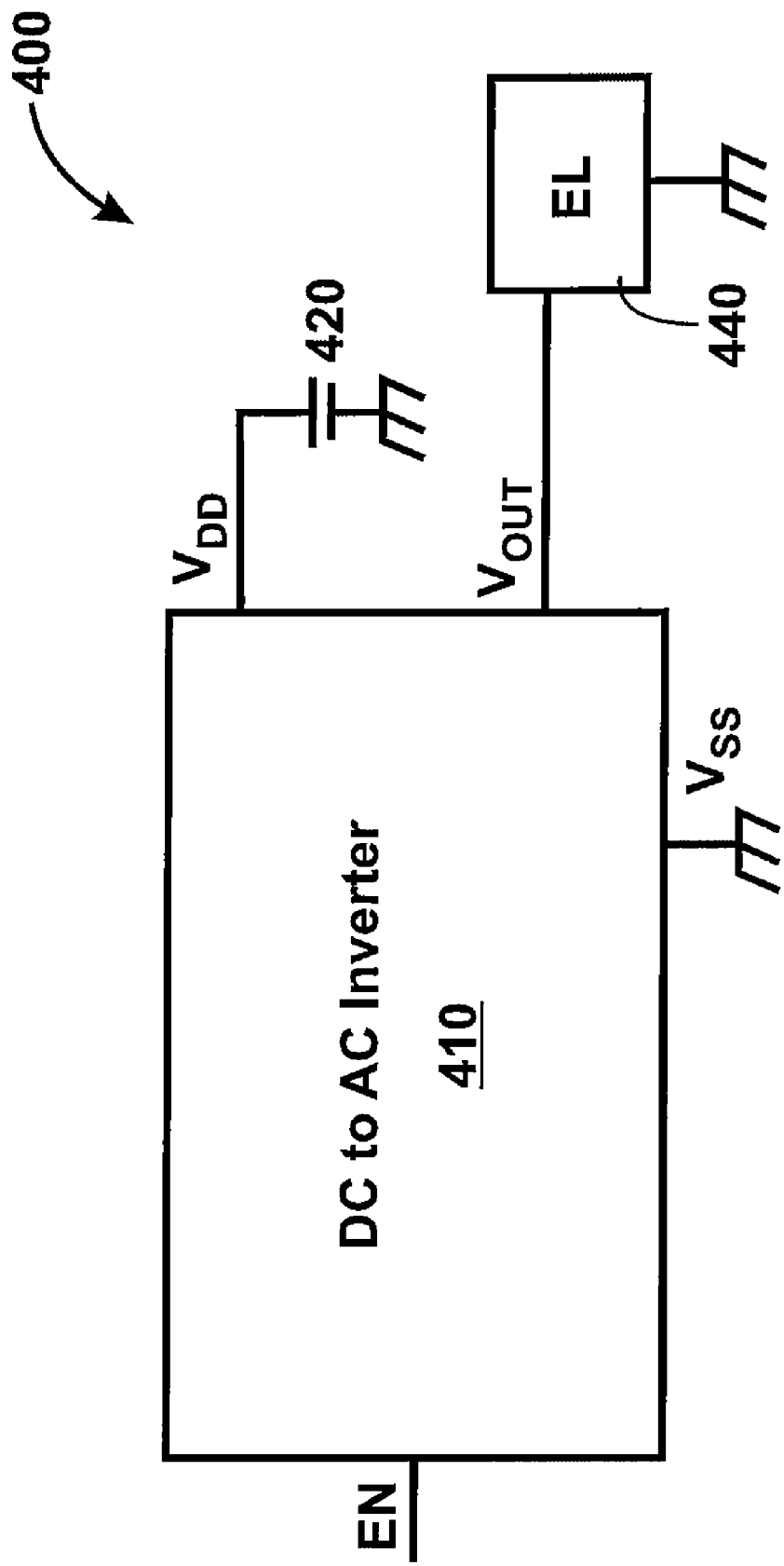
FIG. 4 is a simplified diagram of a of power supply connected to a electroluminescent device e according to an embodiment of the present invention.

FIG. 4 is a simplified diagram of a of power supply connected to an electroluminescent device e according to an embodiment of the present invention. This diagram is merely an example, which should not unduly limit the scope of the claims herein. One of ordinary skill in the art would recognize other variations, modifications, and alternatives. As shown, power supply 400 includes a DC to AC inverter 410. DC to AC inverter 410 receives a DC power input from terminal VDD. In a specific example, power input may be a DC battery, for example, a 3.3 V battery. Of course other DC power sources can also be used. DC to AC inverter 410 includes an EN terminal for receiving an control signal and a Vss terminal for providing a ground connection. DC to AC inverter 410 also includes an output terminal Vout for providing AC power to an electroluminescent device 440.

In a conventional keyboard using electroluminescent device, the DC to AC power is required to supply power to complete keyboard. Consequently, the DC to AC inverter is often large and bulky, and tends to be inefficient. These drawbacks can limit the application of electroluminescent devices in portable electronic devices, such as notebook computers. Accordingly, it is desirable to have an improved technique for providing power to luminescent devices for key board apparatus.

Figure 5:
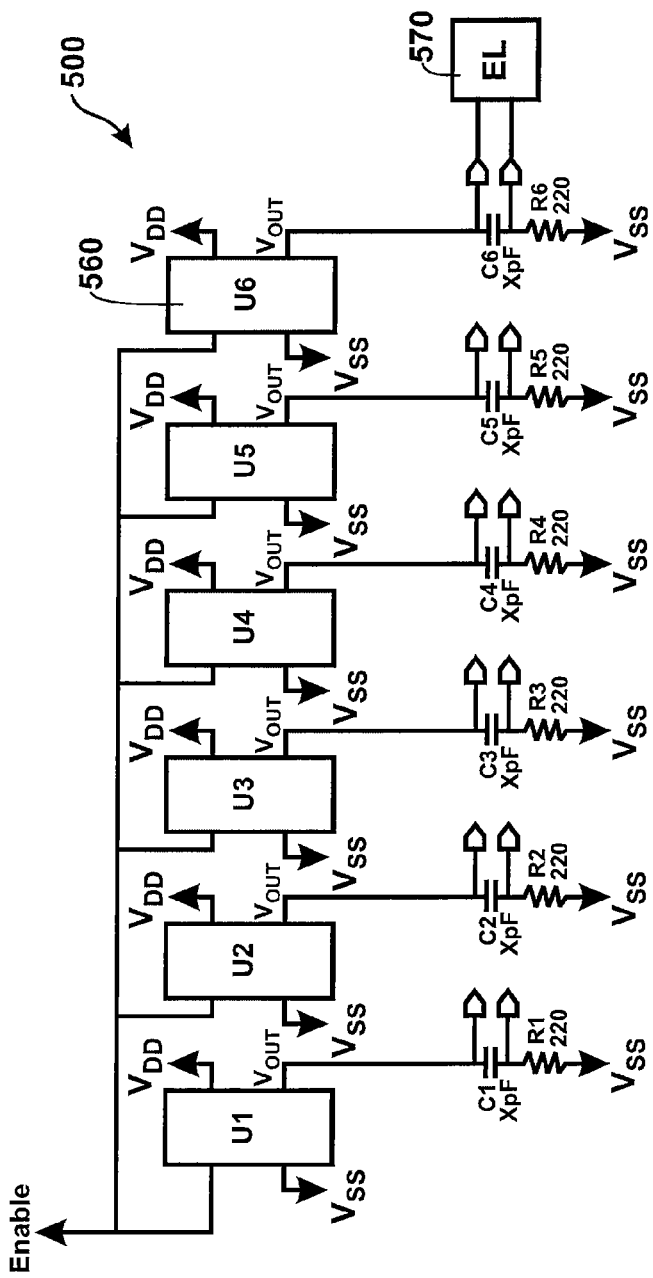
FIG. 5 is a simplified diagram of a power supply system for a luminescent apparatus according to an embodiment of the present invention.

FIG. 5 is a simplified diagram of a power supply system 500 for a luminescent apparatus according to an embodiment of the present invention. This diagram is merely an example, which should not unduly limit the scope of the claims herein. One of ordinary skill in the art would recognize other variations, modifications, and alternatives. As shown, power supply system 500 includes power supply units U1, U2, U3, . . . , U6. In an embodiment, each of the power supply units U1, U2, U3, . . . , U6 may be similar to power supply 400 discussed above. For example, power supply unit U6 (560) includes a terminal for receiving an Enable signal, a VDD terminal for receiving a DC power input, a Vss terminal for ground connection, and a Vout signal for providing an AC power supply to an electroluminescent device 570. As shown, Vout is also coupled to capacitor C6 and resistor R6. In an embodiment, capacitor C6 provides a matching function.

In a specific embodiment, power supply system 500 may be coupled to keyboard 100 as shown in FIG. 1. Keyboard 100 may include luminescent apparatus as described above in connection with FIGS. 2 and 3. In an embodiment, the luminescent apparatus may include electroluminescent segments, each coupled to a power supply unit of power supply system 500. Each of the power supply units can be made smaller and thinner. Such a luminescent apparatus can be advantageously used in a portable computing system. Additionally, it is often difficult to provide uniform illumination to computer keyboards. Some keyboards may have a non-planar configuration. Some keyboards may include components, such as circuit boards, that are not uniform. Other keyboards may include non-uniform light sources. In some embodiments of the invention, a separate segments and an independent driver are coupled to each region for providing uniform illumination for non-planar configurations. Of course, there can be other variations, modifications, and alternatives.

Figure 6:
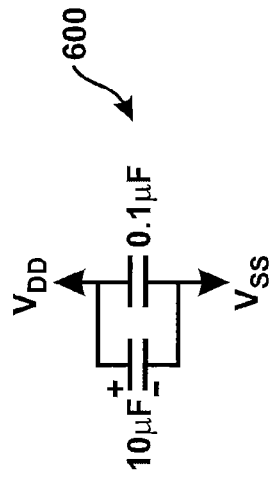
FIG. 6 is a simplified diagram for a matching circuit for a power supply system according to an embodiment of the present invention.

FIG. 6 is a simplified diagram for a matching circuit 600 for a power supply system according to an embodiment of the present invention. This diagram is merely an example, which should not unduly limit the scope of the claims herein. One of ordinary skill in the art would recognize other variations, modifications, and alternatives. As shown, two capacitors are coupled in parallel between the VDD terminal and Vss terminal of a power supply unit such as 560 in FIG. 5. Circuit 600 can be used to reduce the adverse effect resulting from variations in the capacitance of individual luminescent devices.

As discussed above, an electroluminescent (EL) device is operated using an AC power supply. An inverter will convert from DC to AC. The EL luminescence timing is related to EL (Capacitance). As it is difficult to obtain the exactly same capacitance between the separated EL because of inherent variations in the manufacturing process. Therefore, even if we send ON-Off cycle same time, there will be timing difference among the separate EL's. According to an embodiment of the invention, a method is provided for using ground connections to minimize the negative effect.

Figure 7:
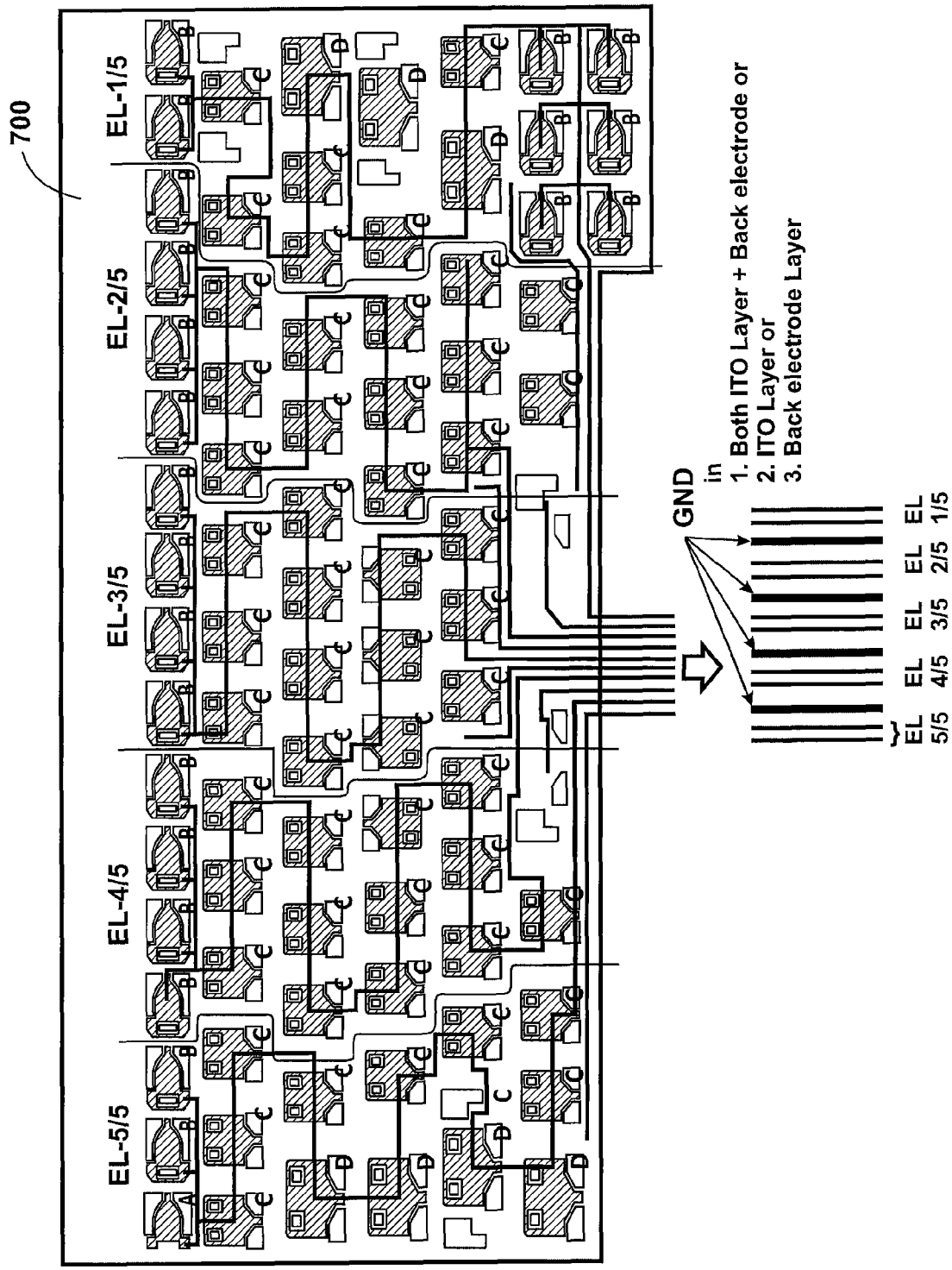
FIG. 7 is a simplified diagram of a method for a keyboard according to an embodiment of the present invention.
Figure 8:
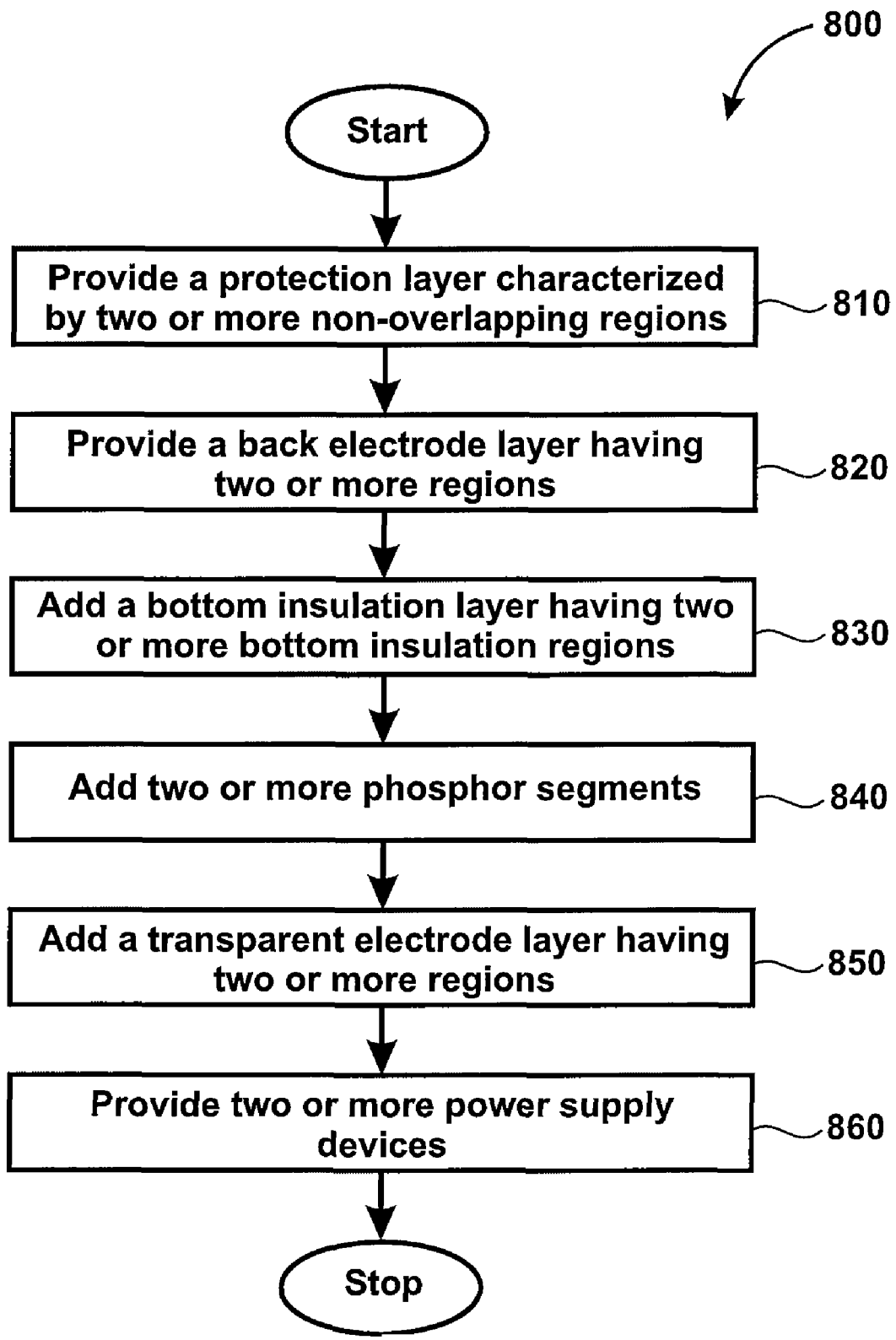
FIG. 8 is a simplified flow diagram illustrating a method for manufacturing a luminescent device for a keyboard apparatus according to an embodiment of the present invention.
Figure 9:
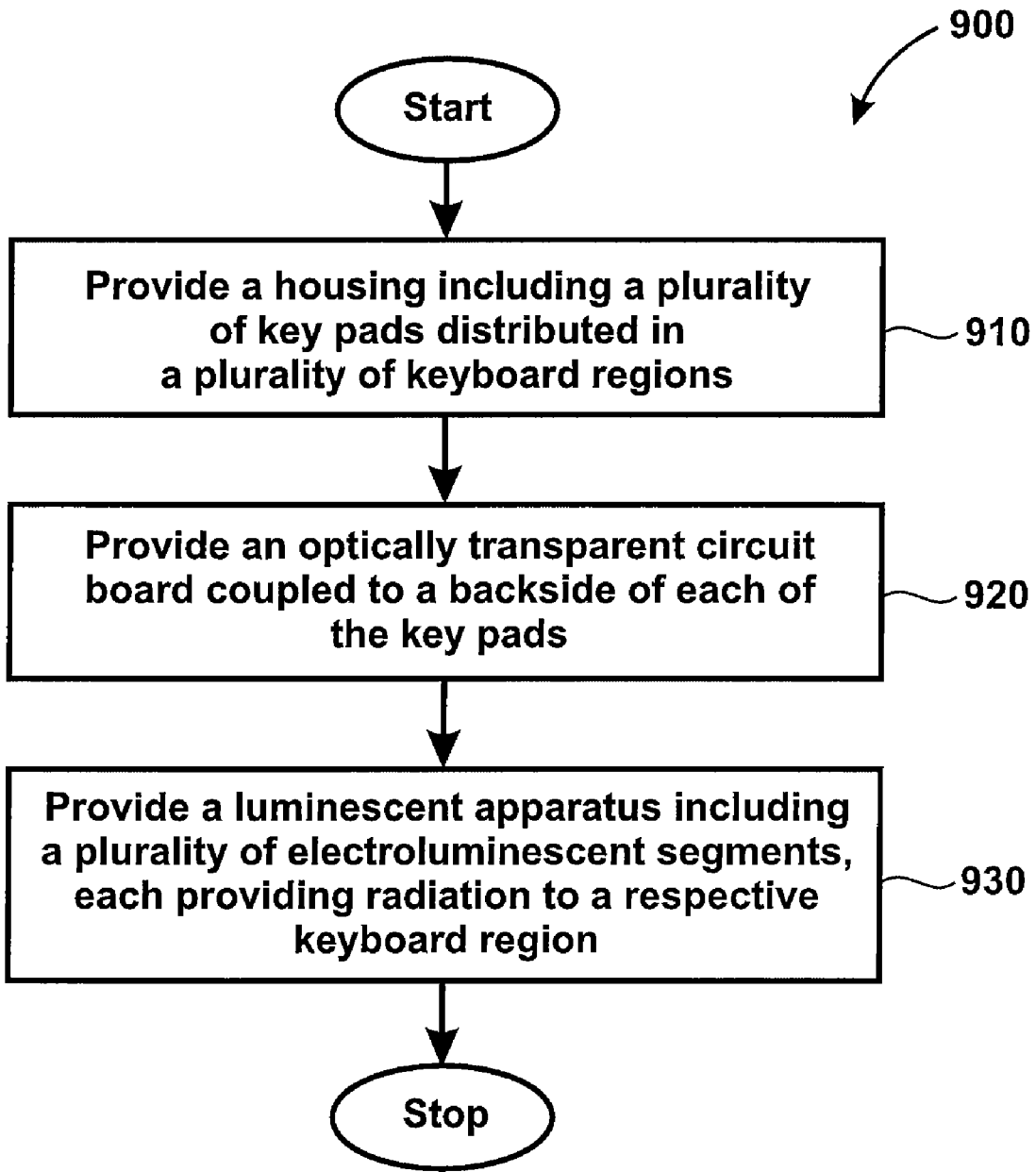
FIG. 9 is a simplified flow diagram illustrating a method for making a keyboard apparatus according to an embodiment of the present invention.

FIG. 7 is a simplified diagram illustrating a method for a keyboard 700 according to an embodiment of the present invention. This diagram is merely an example, which should not unduly limit the scope of the claims herein. One of ordinary skill in the art would recognize other variations, modifications, and alternatives. As shown, the keyboard 700 includes regions marked as EL 1/5, EL 2/5, . . . , EL 5/5. Each region includes an electroluminescent segment for provide lighting to key caps in each region. In an embodiment, an electrical ground connection is provided in each region. These ground connections allow electrical noise insulation between the regions. In an embodiment, the ground connections are provided in the ITO layer. In another embodiment, the ground connection is provided in the ITO layer. In an alternative embodiment, the ground connections are provided in both the ITO and the back electrode layer. In yet another embodiment, the ground connections in the ITO layer and the back electrode layer are coupled together. Of course, there can be other variations and alternatives.

Although the above has been illustrated in terms of specific hardware features, it would be recognized that many variations, alternatives, and modifications can exist. For example, any of the hardware features can be further combined, or even separated. Further details of certain methods according to the present invention can be found throughout the present specification and more particularly below.

According to an embodiment of the invention, a method for manufacturing a luminescent device for a keyboard apparatus can be outline below.

1. (Process 810) providing a protection layer characterized by two or more non-overlapping regions;
2. (Process 820) providing a back electrode layer, the back electrode layer including two or more back electrode regions, each of the two or more back electrode regions overlying a corresponding one of the two or more non-overlapping regions in the protection layer,
3. (Process 830) adding a bottom insulation layer, a bottom insulation layer including two or more bottom insulation regions, each of the two or more bottom insulating regions overlying a corresponding one of the back electrode regions;
4. (Process 840) adding two or more phosphor segments, each of the two or more phosphor segments overlying a corresponding one of the back electrode layers;
5. (Process 850) adding a transparent electrode layer, the transparent electrode layer including two or more transparent electrode regions, each of the two or more transparent electrode region overlying a corresponding one of the phosphor regions; and
6. (Process 860) providing two or more power supply devices, each of the two or more power supply devices being coupled to a corresponding one of the back electrode regions and a corresponding one of the transparent electrode regions for providing luminescence over a corresponding one of the non-overlapping regions.

The above sequence of processes provides a method for manufacturing a luminescent device for a keyboard apparatus according to an embodiment of the present invention. As shown, the method uses a combination of processes including providing separate luminescent devices and power supplies to provide lighting to different regions of a keyboard. Other alternatives can also be provided where steps are added, one or more steps are removed, or one or more steps are provided in a different sequence without departing from the scope of the claims herein.

According to another embodiment of the invention, a method for for making a keyboard can be outlined as follows.

1. (Process 910) providing a housing including a plurality of key pads spatially disposed within the housing, each of the key pads being depressible upon touch by a user, the plurality of key pads being distributed in a plurality of non-overlapping keyboard regions;
2. (Process 920) providing an optically transparent circuit board coupled to a backside of each of the key pads; and
3. (Process 930) providing a luminescent apparatus including a plurality of electroluminescent segments, each of the plurality of electroluminescent segments including one of a corresponding plurality of power supply devices, each of the plurality of electroluminescent segments providing electromagnetic radiation to a respective non-overlapping keyboard region for lighting key pads in the respective non-overlapping keyboard region.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An electroluminescent apparatus, comprising:
    a protection layer characterized by two or more non-overlapping regions;
    a back electrode layer, the back electrode layer including two or more back electrode regions, each of the two or more back electrode regions overlying a corresponding one of the two or more non-overlapping regions in the protection layer;
    a bottom insulation layer, the bottom insulation layer including two or more bottom insulation regions, each of the two or more bottom insulating regions overlying a corresponding one of the back electrode regions;
    two or more electroluminescent segments, each of the two or more electroluminescent segments overlying a corresponding one of the back electrode layers;
    a transparent electrode layer, the transparent electrode layer including two or more transparent electrode regions, each of the two or more transparent electrode region overlying a corresponding one of electroluminescent segments; and
    two or more power supply devices, each of the two or more power supply devices being coupled to a corresponding one of the back electrode regions and being coupled to a corresponding one of the transparent electrode regions for providing luminescence over a corresponding one of the non-overlapping regions.

2. The keyboard apparatus of claim 1, wherein each of the luminescent segments comprises a phosphor-containing material.

3. The electroluminescent apparatus of claim 1, further comprising a first conductive material between two adjacent transparent electrode regions in the transparent electrode layer, the first conductive material being electrically grounded to insulate the two adjacent transparent electrode regions.

4. The electroluminescent apparatus of claim 1, further comprising a second conductive material between two adjacent back electrode regions in the back electrode layer, the second conductive material being electrically grounded to insulate the two adjacent back electrode regions.

5. The electroluminescent apparatus of claim 1, further comprising:
    a first conductive material between two adjacent transparent electrode regions in the transparent electrode layer, the first conductive material being electrically grounded to insulate the two adjacent transparent electrode regions; and
    a second conductive material between two adjacent back electrode regions in the back electrode layer, the second conductive material being electrically grounded to insulate the two adjacent back electrode regions;
    wherein the first conductive material is electrically coupled to the second conductive material.

6. The electroluminescent apparatus of claim 1, wherein the transparent electrode layer further comprises a second plurality of conductive material, each of the second plurality of conductive material being disposed between each pair of adjacent transparent electrode regions in the transparent electrode layer, second plurality of conductive material being electrically grounded.

7. The electroluminescent apparatus of claim 1, wherein the back electrode layer further comprises a second plurality of conductive material, each of the second plurality of conductive material being disposed between each pair of adjacent back electrode regions in the back electrode layer, each of the second plurality of conductive material being electrically grounded.

8. The electroluminescent apparatus of claim 1, wherein each of the two or more power supply devices comprises a DC-to-AC inverter.

9. The electroluminescent apparatus of claim 1, wherein the transparent electrode layer comprises ITO.

10. The electroluminescent apparatus of claim 1, further comprising a PET layer or a glass layer overlying the transparent electrode layer.

11. An electroluminescent apparatus, comprising:
a protection layer characterized by two or more non-overlapping regions;
a back electrode layer, the back electrode layer including two or more back electrode regions, each of the two or more back electrode regions overlying a corresponding one of the two or more non-overlapping regions in the protection layer,
a bottom insulation layer, the bottom insulation layer including two or more bottom insulation regions, each of the two or more bottom insulating regions overlying a corresponding one of the back electrode regions;
a phosphor layer, the phosphor layer including two or more of phosphor regions, each of the two or more phosphor regions overlying a corresponding one of the back electrode layers;
a transparent electrode layer, the transparent electrode layer including two or more transparent electrode regions, each of the two or more transparent electrode region overlying a corresponding one of the phosphor regions; and
two or more power supply devices, each of the two or more power supply devices being coupled to a corresponding one of the back electrode regions and a corresponding one of the transparent electrode regions for providing luminescence over a corresponding one of the non-overlapping regions.

12. A keyboard apparatus comprising:
a housing including a first plurality of key pads spatially disposed within the housing, each of the key pads being depressible upon touch by a user, the first plurality of key pads being distributed in a first plurality of non-overlapping keyboard regions, each of the non-overlapping regions including fewer than all of the first plurality of keypads;
an optically transparent circuit board coupled to a backside of each of the key pads; and
a first plurality of electroluminescent segments arranged in a non-planar configuration, each of the first plurality of electroluminescent segments including one of a corresponding plurality of power supply devices, each of the first plurality of electroluminescent segments providing electromagnetic radiation to a respective non-overlapping keyboard region for lighting key pads in the respective non-overlapping keyboard region, each of the non-overlapping regions including fewer than all of the first plurality of keypads.

13. A keyboard apparatus comprising:
a housing including a plurality of key pads spatially disposed within the housing, each of the key pads being depressible upon touch by a user, the plurality of key pads being distributed in a plurality of non-overlapping keyboard regions, each of the non-overlapping regions including fewer than all of the first plurality of keypads;
an optically transparent circuit board coupled to a backside of each of the key pads; and
a plurality of electroluminescent segments arranged in a non-planar configuration, each of the plurality of electroluminescent segments including one of a corresponding plurality of power supply devices, each of the plurality of electroluminescent segments providing electromagnetic radiation to a respective non-overlapping keyboard region for lighting key pads in the respective non-overlapping keyboard region, each of the non-overlapping regions including fewer than all of the first plurality of keypads.

14. A keyboard apparatus comprising:
a housing including a first plurality of key pads spatially disposed within the housing, each of the key pads being depressible upon touch by a user, the first plurality of key pads being distributed in a second plurality of non-overlapping keyboard regions, each of the non-overlapping regions including fewer than all of the first plurality of keypads;
an optically transparent circuit board coupled to a backside of each of the key pads; and
a second plurality of electroluminescent segments arranged in a non-planar configuration, each of the second plurality of electroluminescent segments including one of a corresponding plurality of power supply devices, each of the second plurality of electroluminescent segments providing electromagnetic radiation to a respective non-overlapping keyboard region for lighting key pads in the respective non-overlapping keyboard region, each of the non-overlapping regions including fewer than all of the first plurality of keypads.

15. A keyboard apparatus comprising:
a housing including a first plurality of key pads spatially disposed within the housing, each of the key pads being depressible upon touch by a user, the first plurality of key pads being distributed in a second plurality of non-overlapping keyboard regions, each of the non-overlapping regions including fewer than all of the first plurality of keypads;
an optically transparent circuit board coupled to a backside of each of the key pads; and
a luminescent apparatus including a second plurality of electroluminescent segments, each of the second plurality of electroluminescent segments including one of a corresponding plurality of power supply devices, each of the second plurality of electroluminescent segments providing electromagnetic radiation to a respective non-overlapping keyboard region for lighting key pads in the respective non-overlapping keyboard region, each of the non-overlapping regions including fewer than all of the first plurality of keypads.

16. The keyboard apparatus of claim 15, wherein the first plurality of key pads include at least twenty six key pads.

17. The keyboard apparatus of claim 15, wherein each of the luminescent segments comprises a phosphor-containing material.

18. The keyboard apparatus of claim 15, wherein the luminescent apparatus comprises:
a protection layer characterized by two or more non-overlapping regions;
a back electrode layer, the back electrode layer including two or more back electrode regions, each of the two or more back electrode regions overlying a corresponding one of the two or more non-overlapping regions in the protection layer, a bottom insulation layer, a bottom insulation layer including two or more bottom insulation regions, each of the two or more bottom insulating regions overlying a corresponding one of the back electrode regions;

two or more of phosphor regions, each of the two or more phosphor regions overlying a corresponding one of the back electrode layers;

a transparent electrode layer, the transparent electrode layer including two or more transparent electrode regions, each of the two or more transparent electrode region overlying a corresponding one of the phosphor regions; and two or more power supply devices, each of the two or more power supply devices being coupled to a corresponding one of the back electrode regions and a corresponding one of the transparent electrode regions for providing luminescence over a corresponding one of the non-overlapping regions.

19. The keyboard apparatus of claim 18, wherein the luminescent apparatus further comprises a first conductive material between two adjacent transparent electrode regions in the transparent electrode layer, the first conductive material being electrically grounded to insulate the two adjacent transparent electrode regions.

20. The keyboard apparatus of claim 18, wherein the luminescent apparatus further comprises a second conductive material between two adjacent back electrode regions in the back electrode layer, the second conductive material being electrically grounded to insulate the two adjacent back electrode regions.

21. The keyboard apparatus of claim 18, wherein the luminescent apparatus further comprises:
    a first conductive material between two adjacent transparent electrode regions in the transparent electrode layer, the first conductive material being electrically grounded to insulate the two adjacent transparent electrode regions; and
    a second conductive material between two adjacent back electrode regions in the back electrode layer, the second conductive material being electrically grounded to insulate the two adjacent back electrode regions;
    wherein the first conductive material is electrically coupled to the second conductive material.

22. The keyboard apparatus of claim 18, wherein the transparent electrode layer further comprises a second plurality of conductive material, each of the second plurality of conductive material being disposed between each pair of adjacent transparent electrode regions in the transparent electrode layer, second plurality of conductive material being electrically grounded.

23. The keyboard apparatus of claim 18, wherein the back electrode layer further comprises a second plurality of conductive material, each of the second plurality of conductive material being disposed between each pair of adjacent back electrode regions in the back electrode layer, each of the second plurality of conductive material being electrically grounded.

24. The keyboard apparatus of claim 18, wherein each of the plurality of the two or more power supply devices comprises a DC-to-AC inverter.

25. The keyboard apparatus of claim 18, wherein the transparent electrode layer comprises ITO.

26. The keyboard apparatus of claim 15, further comprising a PET layer or a glass layer overlying the transparent electrode layer.

27. The keyboard apparatus of claim 15, further comprising a DC power source coupled to the two or more power supply devices.

28. A method for manufacturing a luminescent device for a keyboard apparatus, the method comprising:
    providing a protection layer characterized by two or more non-overlapping regions;
    providing a back electrode layer, the back electrode layer including two or more back electrode regions, each of the two or more back electrode regions overlying a corresponding one of the two or more non-overlapping regions in the protection layer,
    adding a bottom insulation layer, a bottom insulation layer including two or more bottom insulation regions, each of the two or more bottom insulating regions overlying a corresponding one of the back electrode regions;
    adding two or more phosphor segments, each of the two or more phosphor segments overlying a corresponding one of the back electrode layers;
    adding a transparent electrode layer, the transparent electrode layer including two or more transparent electrode regions, each of the two or more transparent electrode region overlying a corresponding one of the phosphor regions; and
    providing two or more power supply devices, each of the two or more power supply devices being coupled to a corresponding one of the back electrode regions and a corresponding one of the transparent electrode regions for providing luminescence over a corresponding one of the non-overlapping regions.

29. The method of claim 28, further comprising providing a first conductive material between two adjacent transparent electrode regions in the transparent electrode layer, the first conductive material being electrically grounded to insulate the two adjacent transparent electrode regions.

30. The method of claim 28, further comprising providing a second conductive material between two adjacent back electrode regions in the back electrode layer, the second conductive material being electrically grounded to insulate the two adjacent back electrode regions.

31. The method of claim 28, further comprising:
    providing a first conductive material between two adjacent transparent electrode regions in the transparent electrode layer, the first conductive material being electrically grounded to insulate the two adjacent transparent electrode regions;
    adding a second conductive material between two adjacent back electrode regions in the back electrode layer, the second conductive material being electrically grounded to insulate the two adjacent back electrode regions; and
    coupling the first conductive material electrically to the second conductive material.

32. The method of claim 28, wherein the transparent electrode layer further comprises a second plurality of conductive material, each of the second plurality of conductive material being disposed between each pair of adjacent transparent electrode regions in the transparent electrode layer, second plurality of conductive material being electrically grounded.

33. The method of claim 28, wherein the back electrode layer further comprises a second plurality of conductive material, each of the second plurality of conductive material being disposed between each pair of adjacent back electrode regions in the back electrode layer, each of the second plurality of conductive material being electrically grounded.

34. The method of claim 28, wherein each of the two or more power supply devices comprises a DC-to-AC inverter.

35. The method of claim 28, wherein the transparent electrode layer comprises ITO.

36. The method of claim 28, further comprising adding a PET layer or a glass layer overlying the transparent electrode layer.

37. A method for making a keyboard apparatus comprising:
provMetadata a housing including a plurality of key pads spatially disposed within the housing, each of the key pads being depressible upon touch by a user, the plurality of key pads being distributed in a plurality of non-overlapping keyboard regions;
providing an optically transparent circuit board coupled to a backside of each of the key pads; and
providing a luminescent apparatus including a plurality of electroluminescent segments, each of the plurality of electroluminescent segments including one of a corresponding plurality of power supply devices, each of the plurality of electroluminescent segments providing electromagnetic radiation to a respective non-overlapping keyboard region for lighting key pads in the respective non-overlapping keyboard region.

38. The method of claim 37, wherein the plurality of key pads include at least twenty six key pads.

39. The method of claim 37 wherein each of the luminescent segments comprises a phosphor-containing material.

40. The method of claim 37 wherein the luminescent apparatus further comprises:
a protection layer characterized by two or more non-overlapping regions;
a back electrode layer, the back electrode layer including two or more back electrode regions, each of the two or more back electrode regions overlying a corresponding one of the two or more non-overlapping regions in the protection layer,
a bottom insulation layer, a bottom insulation layer including two or more bottom insulation regions, each of the two or more bottom insulating regions overlying a corresponding one of the back electrode regions;
two or more of phosphor regions, each of the two or more phosphor regions overlying a corresponding one of the back electrode layers;
a transparent electrode layer, the transparent electrode layer including two or more transparent electrode regions, each of the two or more transparent electrode region overlying a corresponding one of the phosphor regions; and
two or more power supply devices, each of the two or more power supply devices being coupled to a corresponding one of the back electrode regions and a corresponding one of the transparent electrode regions for providing luminescence over a corresponding one of the non-overlapping regions.

41. The method of claim 37 wherein the luminescent apparatus further comprises a first conductive material between two adjacent transparent electrode regions in the transparent electrode layer, the first conductive material being electrically grounded to insulate the two adjacent transparent electrode regions.

42. The method of claim 37 wherein the luminescent apparatus further comprises a second conductive material between two adjacent back electrode regions in the back electrode layer, the second conductive material being electrically grounded to insulate the two adjacent back electrode regions.

43. The method of claim 37 wherein the luminescent apparatus further comprises:
a first conductive material between two adjacent transparent electrode regions in the transparent electrode layer, the first conductive material being electrically grounded to insulate the two adjacent transparent electrode regions; and
a second conductive material between two adjacent back electrode regions in the back electrode layer, the second conductive material being electrically grounded to insulate the two adjacent back electrode regions;
wherein the first conductive material is electrically coupled to the second conductive material.

44. The method of claim 37 wherein the transparent electrode layer further comprises a second plurality of conductive material, each of the second plurality of conductive material being disposed between each pair of adjacent transparent electrode regions in the transparent electrode layer, second plurality of conductive material being electrically grounded.

45. The method of claim 37 wherein the back electrode layer further comprises a second plurality of conductive material, each of the second plurality of conductive material being disposed between each pair of adjacent back electrode regions in the back electrode layer, each of the second plurality of conductive material being electrically grounded.

46. The method of claim 37 wherein each of the plurality of the two or more power supply devices comprises a DC-to-AC inverter.

47. The method of claim 37 wherein the transparent electrode layer comprises ITO.

48. The method of claim 37 further comprising providing a PET layer or a glass layer overlying the transparent electrode layer.

49. The method of claim 37 further comprising providing a DC power source coupled to the two or more power supply devices.

* * * * *